United States Patent
Nagai et al.

(10) Patent No.: US 7,803,472 B2
(45) Date of Patent: Sep. 28, 2010

(54) SUBSTRATE GLASS FOR DATA STORAGE MEDIUM AND GLASS SUBSTRATE

(75) Inventors: Kensuke Nagai, Chiyoda-ku (JP); Tetsuya Nakashima, Chiyoda-ku (JP); Kei Maeda, Chiyoda-ku (JP); Tatsuo Nagashima, Chiyoda-ku (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 12/477,285

(22) Filed: Jun. 3, 2009

(65) Prior Publication Data

US 2009/0239035 A1 Sep. 24, 2009

Related U.S. Application Data

(63) Continuation of application No. PCT/JP2008/055307, filed on Mar. 21, 2008.

(30) Foreign Application Priority Data

Mar. 23, 2007 (JP) ............................. 2007-077020

(51) Int. Cl.
  *G11B 5/64* (2006.01)
  *C03C 21/00* (2006.01)

(52) U.S. Cl. .................. 428/846.9; 501/55; 501/108; 65/30.14

(58) Field of Classification Search ............. 428/846.9, 428/846.3, 848, 409, 410, 62.4; 365/222, 365/232; 501/5, 7, 4, 14, 15, 55, 59, 70, 501/108; 65/29.21, 30.14, 64, 66; 360/135
See application file for complete search history.

(56) References Cited

U.S. PATENT DOCUMENTS

| | | | |
|---|---|---|---|
| 5,599,754 A | 2/1997 | Maeda et al. | |
| 6,063,470 A * | 5/2000 | Zou et al. | 428/64.2 |
| 6,297,182 B1 | 10/2001 | Maeda et al. | |
| 6,313,052 B1 | 11/2001 | Nakashima et al. | |
| 6,387,510 B1 | 5/2002 | Nakashima et al. | |
| 6,949,485 B2 | 9/2005 | Nakashima et al. | |
| 7,208,238 B2 | 4/2007 | Ikenishi et al. | |
| 7,462,411 B2 | 12/2008 | Ikenishi et al. | |
| 2002/0010066 A1 * | 1/2002 | Nakashima et al. | 501/7 |
| 2005/0162956 A1 * | 7/2005 | Ikenishi et al. | 365/222 |
| 2006/0216552 A1 | 9/2006 | Ikenishi et al. | |
| 2009/0110963 A1 | 4/2009 | Nakashima et al. | |
| 2009/0137379 A1 * | 5/2009 | Nagai et al. | 501/70 |

FOREIGN PATENT DOCUMENTS

| | | |
|---|---|---|
| JP | 2000-351649 | 12/2000 |
| JP | 2001-058843 | 3/2001 |
| JP | 2001-134925 | 5/2001 |
| JP | 2001-172043 | 6/2001 |
| JP | 2001-294441 | 10/2001 |
| JP | 2002-029774 | 1/2002 |
| WO | 2008-062847 | 5/2008 |

OTHER PUBLICATIONS

Kobayashi et al (JP 2002-029774) Jan. 29, 2002 machine translation.*
Nakajima et al (JP 2000-351649) Dec. 19, 2000 machine translation.*
Nakajima et al (JP 2001-294441) Oct. 23, 2001 machine translation.*
Translation JP 2001-172043 (Jun. 2001).*
Translation JP 2000-351649 (Dec. 2000).*
Translation JP 2001-058843 (Mar. 2001).*

* cited by examiner

*Primary Examiner*—Kevin M. Bernatz
*Assistant Examiner*—Louis Falasco
(74) *Attorney, Agent, or Firm*—Oblon, Spivak, McClelland, Maier & Neustadt, L.L.P.

(57) ABSTRACT

To provide a substrate glass for data storage medium which is excellent in weather resistance even when no additional treatment such as chemical reinforcement treatment is applied and less susceptible to a whitening phenomenon and which has a glass transition temperature of at least 680° C. and is excellent in acid resistance.

A substrate glass for data storage medium, which comprises, as represented by mass %, from 47 to 60% of $SiO_2$, from 8 to 20% of $Al_2O_3$, from 0 to 8% of MgO, from 0 to 6% of CaO, from 1 to 18% of SrO, from 0 to 13% of BaO, from 1 to 6% of $TiO_2$, from 1 to 5% of $ZrO_2$, from 2 to 8% of $Na_2O$ and from 1 to 15% of $K_2O$ and which has a glass transition temperature of at least 680° C.

16 Claims, No Drawings

SUBSTRATE GLASS FOR DATA STORAGE MEDIUM AND GLASS SUBSTRATE

TECHNICAL FIELD

The present invention relates to a substrate glass to be used for a substrate of a data storage medium such as a magnetic disk or an optical disk, and a glass substrate.

BACKGROUND ART

Soda lime silica glass is widely used as a substrate glass for data storage medium such as a magnetic disk or an optical disk. However, a substrate made of soda lime silica glass was likely to undergo a so-called whitening phenomenon, whereby the surface state was likely to be substantially changed during its storage. Therefore, when such soda lime silica glass was used as a substrate for a magnetic disk, there was a problem such that a film such as an undercoating film, a magnetic film, a protective film or the like, formed on such a substrate was likely to be peeled. Further, in order to prevent such a whitening phenomenon, the soda lime silica glass may be subjected to chemical reinforcement treatment. However, such chemical reinforcement treatment increases a process step and brings about a problem such that stain is likely to remain on the surface of the substrate after the chemical reinforcement treatment. Under the circumstances, heretofore, a substrate glass for data storage medium has been proposed which is less susceptible to a whitening phenomenon and which is excellent in weather resistances even if no additional treatment such as chemical reinforcement treatment is applied (Patent Documents 1 and 2).

Patent Document 1: U.S. Pat. No. 6,949,485
Patent Document 2: U.S. Pat. No. 5,599,754

DISCLOSURE OF THE INVENTION

Problems to Be Solved By the Invention

However, the glass transition point (Tg) of the substrate glass disclosed in Patent Document 2 was lower than 680° C., and no glass substrate with a glass transition point exceeding 680° C. was disclosed. Whereas, Patent Document 1 discloses in Example 8 a substrate glass for data storage medium having a glass transition point of 710° C., but this glass has problems such that the acid resistance is very poor (the weight reduction when the glass is immersed in a 0.1 mol/L HCl aqueous solution at 90° C. for 20 hours is 11.3 mg/cm$^2$), and the glass is likely to undergo surface roughening when exposed to a reagent solution having a low pH in its polishing step or cleaning step.

Therefore, it is an object of the present invention to provide a substrate glass for data storage medium which is excellent in weather resistance and hardly susceptible to a whitening phenomenon even without carrying out additional treatment such as chemical reinforcement treatment and which has a glass transition point of at least 680° C. and is excellent in acid resistance.

Means to Solve the Problems

The present invention provides a substrate glass for data storage medium, which comprises, as represented by mass %, from 47 to 60% of $SiO_2$, from 8 to 20% of $Al_2O_3$, from 0 to 8% of MgO, from 0 to 6% of CaO, from 1 to 18% of SrO, from 0 to 13% of BaO, from 1 to 6% of $TiO_2$, from is 1 to 5% of $ZrO_2$, from 2 to 8% of $Na_2O$ and from 1 to 15% of $K_2O$ and which has a glass transition temperature of at least 680° C.

Further, the present invention provides a glass substrate made of the above substrate glass for data storage medium.

EFFECTS OF THE INVENTION

According to the present invention, it is possible to provide a glass substrate for data storage medium having the following characteristics.

(1) Even without chemical reinforcement treatment, the weather resistance is excellent, and deposition (whitening) scarcely takes place during the storage.

(2) The thermal expansion coefficient can be made equal to or higher than that of soda lime silica glass which has heretofore been used.

(3) The glass transition point can be made higher than 680° C., whereby it is possible to increase the record density of the data storage medium.

(4) The acid resistance is excellent, and the glass is hardly susceptible to surface roughening when exposed to a reagent solution having a low pH in its polishing step or cleaning step.

(5) The density is as small as at most 2.8 g/cm$^3$, and when adopted as a data storage medium, it can be made light in weight. Further, the substrate is hardly flexible, and it is possible to increase the storage capacity. Further, the storage medium is hardly breakable upon receipt of an impact.

(6) The Young's modulus is as high as at least 75 GPa, and the substrate is hardly flexible, whereby it is possible to increase the storage capacity. Further, the storage medium is hardly breakable upon receipt of an impact.

(7) It is possible to prevent deterioration in the yield due to devitrification during the preparation of the glass substrate.

BEST MODE FOR CARRYING OUT THE INVENTION

The substrate glass of the present invention (hereinafter sometimes referred to simply as the glass of the present invention) is useful as a substrate for a data storage medium such as a magnetic disk or an optical disk. Unless otherwise specified, the composition will be shown by mass percentage.

The acid resistance of the glass of the present invention (the weight reduction when the glass is immersed in a 0.1 mol/L HCl aqueous solution at 90° C. for 20 hours) is preferably at most 5 mg/cm$^2$, more preferably at most 1 mg/cm$^2$, particularly preferably at most 0.5 mg/cm$^2$, most preferably at most: 0.1 mg/cm$^2$. The reason as to why such acid resistance is preferred is that the glass is hardly susceptible to surface roughening when exposed to a reagent solution having a low pH in its polishing step or cleaning step.

The average linear expansion coefficient of the glass of the present invention at from 50 to 350° C. (hereinafter sometimes referred to as the thermal expansion coefficient) is preferably equal or higher than the soda lime silica glass, i.e. at least 75×10$^{-7}$/° C., more preferably at least 76×10$^{-7}$/° C., particularly preferably at least 77×10$^{-7}$/° C., most preferably at least 78×10$^{-7}$/° C. The reason as to why such a thermal expansion coefficient is preferred is that the thermal expansion coefficient is desired to be closer to the thermal expansion coefficient (typically at least 100×10$^{-7}$/° C.) of a metal of the hub to be attached to the substrate for data storage medium, i.e. at least higher than the thermal expansion coefficient of soda lime silica glass which has been heretofore used.

The glass transition point of the glass of the present invention is at least 680° C., more preferably at least 685° C., most preferably at least 690° C. The reason for the glass transition point being at least 680° C. is that it is thereby easy to increase the record density of the data storage medium. Namely, in order to increase the record density, it is effective to increase the coercive force of a magnetic layer as a magnetic recording layer, and for that purpose, it is necessary to carry out the heat treatment for forming the magnetic layer, at a higher temperature. If the glass transition point of the glass to be used for the substrate for data storage medium is lower than 680° C., such heat treatment may not be carried out at a desired temperature.

The glass of the present invention is preferably such that the difference $\Delta T$ ($=T_L-T_4$) between the liquid phase temperature $T_L$ and the temperature $T_4$ at which its viscosity becomes $10^4$ dPa·s, is at most 50° C., i.e. $\Delta T \leq 50$° C. If $\Delta T$ exceeds 50° C., forming tends to be difficult, and it is more preferably at most 30° C., particularly preferably at most 0° C. The reason as to why such $\Delta T$ is preferred is that deterioration in yield by devitrification can thereby be prevented at the time of mass production by e.g. a float process, a fusion process, a down-draw process or a press process. It is particularly preferred that the glass of the present invention can be formed by a float process.

The glass of the present invention preferably has a density of at most 2.8 g/cm$^3$, more preferably at most 2.77 g/cm$^3$, most preferably at most 2.75 g/cm$^3$. The reason as to why such a density is preferred is that the data storage medium can thereby be made light in weight. Further, it is thereby possible to prevent an increase in deflection or warpage of the substrate due to reduction in thickness of the substrate at the time of reducing the distance between the recording medium and a reading head by reducing the thickness of the substrate to increase the storage capacity of the recording medium. Further, when the storage medium receives an impact, the substrate is thereby hardly flexed to prevent formation of a stress thereby to prevent breakage.

The Young's modulus of the glass of the present invention i.e. the Young's modulus of the glass substrate of the present invention, is preferably at least 75 GPa, more preferably at least 76 GPa, particularly preferably at least 78 GPa, most preferably at least 80 GPa. The reason as to why such a Young's modulus is preferred, is that it is thereby possible to prevent an increase in deflection or warpage of the substrate due to reduction in the thickness of the substrate at the time of reducing the distance between the storage medium and a reading head by reducing the thickness of the substrate to increase the storage capacity of the recording medium. Further, when the storage medium receives an impact, the substrate tends to be hardly flexed to prevent formation of a stress thereby to prevent breakage.

Now, the composition (the contents of the respective components) of the substrate glass of the present invention will be described based on oxides by mass percentage unless otherwise specified.

$SiO_2$ is an essential component to form the skeleton of the glass. If it is less than 47%, the glass tends to be unstable. Further, the weather resistance, the acid resistance or the Young's modulus is likely to be low. It is preferably at least 48%, particularly preferably at least 49%, most preferably at least 50%. If it exceeds 60%, the thermal expansion coefficient tends to be too small, and the melting temperature to prepare the glass tends to be too high. It is preferably at most 57%.

Further, the content of $SiO_2$ by mol percentage is preferably at least 59%. If $SiO_2$ is less than 59 mol %, the acid resistance is likely to be low.

$Al_2O_3$ has an effect to increase the weather resistance or the Young's modulus of the glass and is an essential component. Further, it has an effect to increase the glass transition point. If it is less than 8%, such effects tend to be small. It is preferably at least 10%, more preferably at least 11%. If it exceeds 20%, the viscosity of the molten glass tends to be too high, whereby forming, particularly float forming, tends to be difficult, and further, the liquid phase temperature tends to be too high. It is preferably at most 18%, more preferably at most 17%, particularly preferably at most 16%.

MgO is not an essential component, but has an effect to lower the viscosity of the molten glass thereby to make the glass readily meltable and to increase the Young's modulus, and it may be contained up to 8%. If it exceeds 8%, the chemical durability tends to deteriorate, and the glass tends to be unstable, and the liquid phase temperature may also tends to be too high. In a case where it is desired to further reduce the above-mentioned $\Delta T$, it is preferably at most 7%. In a case where MgO is contained, it is preferably contained in an amount of at least 1%.

CaO is not an essential component, but has an effect to lower the viscosity of the molten glass, to increase the Young's modulus or to make the glass readily meltable, and it may be contained up to 6%. If CaO exceeds 6%, the chemical durability of the glass tends to deteriorate, and the glass tends to be unstable, or the liquid phase temperature tends to be too high. It is preferably at most 5.5%. In a case where it is desired to lower the liquid phase temperature or to further reduce $\Delta T$, it is also preferred that CaO is contained in an amount of at least 1.5%. If it is attempted to reduce CaO to a level of less than 1.5%, the thermal expansion coefficient tends to be low. In order to avoid such tendency, if an alkali metal oxide is increased, the glass transition point tends to be low, and if SrO or BaO is increased, the density tends to be large, and if MgO is increased, the liquid phase temperature tends to be high, such being problematic. It is preferably at least 2%.

SrO has an effect to increase the thermal expansion coefficient or to lower the viscosity of the molten glass to make the glass readily meltable, and is essential. If it is less than 1%, such an effect is small. It is preferably at least 2%, more preferably at least 3%, particularly preferably at least 4%, most preferably at least 5%. If it exceeds 18%, the chemical durability tends to deteriorate, and the glass tends to be unstable, and the liquid phase temperature also tends to be too high, and the density of the glass is likely to be too high. It is preferably at most: 17%, more preferably at most 16%, particularly preferably at most 15%, most preferably at most 14%.

BaO is not an essential component, but has an effect to increase the glass transition point, to increase the thermal expansion coefficient or to lower the viscosity of the molten glass to make the glass readily meltable, and it may be contained up to 13%. If it exceeds 13%, the weather resistance of the glass tends to be low, the liquid phase temperature tends to be too high, and the density of the glass is likely to be too high. It is preferably at most 10%. In a case where it is desired to reduce the density, it is preferably at most 8%. In a case where BaO is contained, it is preferably contained in an amount of at least 0.5%. Further, in a case where the weather resistance is desired to be further improved, it is preferred that substantially no BaO is contained.

$TiO_2$ has an effect to increase the thermal expansion coefficient, to increase the weather resistance of the glass, to increase the glass transition point or to increase the Young's modulus and is essential. If it exceeds 6%, the glass is likely to be unstable. It is preferably at most 5%. If it is less than 1%, the heat resistance or the glass transition point of the glass tends to be low. It is preferably at least 2%, more preferably at least 3%.

$ZrO_2$ has an effect to increase the weather resistance of the glass or to increase the glass transition point and is essential. If it exceeds 5%, the glass is likely to be unstable, the liquid phase temperature is likely to be too high, and the density is likely to be too high.

The sum ($TiO_2+ZrO_2$) of the contents of $TiO_2$ and $ZrO_2$ is preferably at most 11%. If ($TiO_2+ZrO_2$) is less than 11%, the heat resistance or the glass transition point tends to be low, or the high temperature viscosity is likely to be high.

The sum of the contents of BaO and $ZrO_2$ is preferably at most 6.5 mol %. If this sum exceeds 6.5 mol %, the density or the liquid phase temperature is likely to be too high.

$Na_2O$ has an effect to increase the thermal expansion coefficient or to lower the viscosity of the molten glass thereby to make the glass readily meltable, and is essential.

If $Na_2O$ exceeds 8%, the weather resistance of the glass is likely to be low. It is preferably at most 5%. If it is less than 2%, the thermal expansion coefficient tends to be small.

$K_2O$ has an effect to increase the thermal expansion coefficient or to lower the viscosity of the molten glass thereby to make the glass readily meltable, and is essential.

If $K_2O$ exceeds 15%, the weather resistance of the glass tends to be low, and the liquid phase temperature is likely to be too high. It is preferably at most 14.5%, more preferably at most 13%, particularly preferably at most 12%, most preferably less than 11%. If it is less than 1%, the thermal expansion coefficient tends to be small. It is preferably at least 3%, more preferably at least 5%.

($Na_2O+K_2O$) is preferably at most 16%. If it exceeds 16%, the weather resistance tends to be low, or the glass transition point is likely to be low. It is preferably at most 15%, more preferably a: most 14%, particularly preferably at most 13%. ($Na_2O+K_2O$) is preferably at least 5%. If it is less than 5%, the viscosity of the molten glass is likely to be too high. It is more preferably at least 8%.

$K_2O/Na_2O$ is preferably at least 1.5 and at most 40. If it is less than 1.5, the glass transition point tends to be low, or the thermal expansion coefficient is likely to be too small. Or, in order to prevent a decrease in the glass transition point, it will be required to incorporate a larger amount of $Al_2O_3$, $ZrO_2$, $SiO_2$ or the like, whereby the high temperature viscosity is likely to be high. If it exceeds 40, the viscosity of the molten glass is likely to be too high. It is preferably at most 30, more preferably at most 10, particularly preferably at most 5.

$SiO_2/(TiO_2+ZrO_2)$ is preferably from 5.0 to 10.0. If it is less than 5.0, the glass transition point is likely to be low. If it exceeds 10, the liquid phase temperature is likely to be high. It is preferably at most 9.8, more preferably at most 9.5.

The glass of the present invention consists substantially or essentially of the above components, but may contain other components which will be exemplified hereinafter, within a range not to impair the purpose of the present invention. The total of the contents of the components other than the above-described components is preferably at most 20%, more preferably at most 5%.

A clarifying agent such as $SO_3$, Cl, $As_2O_3$ or $Sb_2O_3$ and a colorant such as $Fe_2O_3$, NiO or CoO, may be contained up to 5% in the total amount.

ZnO and $Li_2O$ may be contained up to 10% in the total amount in order to increase the thermal expansion coefficient or to lower the viscosity of the molten glass thereby to make the glass readily meltable. In a case where $Li_2O$ is contained, the content is more preferably from 0.1 to 5%. If the content of $Li_2O$ exceeds 5%, the weather resistance tends to be low, or the glass transition point is likely to be low. The total amount is more preferably at most 5%, particularly preferably at most 3%.

In order to improve the meltability or stability of the glass, $B_2O_3$, $P_2O_5$, $V_2O_5$, etc., or in order to increase the Young's modulus, rare earth metal oxides such as $La_2O_3$, $Y_2O_3$, etc., may be contained up to 15%, preferably at most 5%, in their total amount.

The ratio of the total of the contents, as represented by mol %, of SiO and BaO to RO (the total of the contents, as represented by mol %, of MgO, CaO, SrO and BaO) is preferably at least 0.01 and at most 3. If it is less than 0.01, the liquid phase temperature of the glass tends to be too high, and the glass transition point is likely to be low. If it exceeds 3, the weather resistance of the glass tends to be low, the density of the glass is likely to be too high, and the strength of the glass is likely to be low. It is preferably at most 2, more preferably at most 1.

The glass substrate of the present invention is used as a substrate for a data storage medium such as a magnetic disk or an optical disk.

The glass substrate of the present invention is made of the glass of the present invention, and it is preferred that when the surface is thoroughly cleaned to such a state where no deposition is observed, and then it is held in a steam atmosphere at 120° C. under 2 atm for 20 hours, the number $N_L$ of deposits having a size of at least 10 μm present on the surface of the glass substrate, is at most 1/cm$^2$, and the number $N_S$ of despots having a size of at least 1 μm and less than 10 μm present thereon, is at most $10^7$/cm$^2$.

If $N_L$ exceeds 1/cm$^2$ or if $N_S$ exceeds $10^7$/cm$^2$, deposits (whitening) will form on the surface of the glass substrate during the storage of the glass substrate, whereby in a magnetic disk, a film such as an undercoating film, a magnetic film, a protective film or the like formed on the glass substrate, is likely to be peeled. Such deposits are considered to be a reaction product formed and deposited on the glass substrate due to the influence of moisture or carbon dioxide gas in air, and can not be removed by wiping. $N_L$ is preferably at most 0.5/cm$^2$, more preferably at most 0.2/cm$^2$. $N_S$ is preferably at most $10^5$/cm$^2$, more preferably at most $0.8 \times 10^5$/cm$^2$, particularly preferably at most $0.6 \times 10^5$/cm$^2$.

The processes for producing the glass and the glass substrate of the present invention are not particularly limited, and various processes may be applied. For example, materials for the respective components which are commonly used may be blended to have a desired composition, and such a composition is heated and melted by a glass melting furnace. The glass is homogenized by bubbling, stirring, addition of a clarifying agent, etc., and formed into a plate glass having a predetermined thickness by a well-known method such as a float process, a press-process or a down-draw process and annealed, and then, if necessary, subjected to processing such as grinding or polishing, followed by cutting into a glass substrate having a predetermined size and shape. As the forming method, a float process suitable for mass production, is particularly suitable.

EXAMPLES

Materials for the respective components were blended to have a composition shown by mass percentage in the rows for from $SiO_2$ to $K_2O$ in Tables 1 and 2, and melted at a temperature of from 1,550 to 1,650° C. for from 3 to 5 hours by means of a platinum crucible. Then, the molten glass was cast into a plate, followed by annealing.

With respect to the glass plate thus obtained, the glass transition point $T_g$ (unit: ° C.), the thermal expansion coefficient α (unit: ×10-7/° C.), the density ρ (unit: g/cm$^3$), the Young's modulus E (unit: GPa), the temperature $T_4$ (unit: ° C.) at which the viscosity becomes $10^4$ P, the liquid phase temperature $T_L$ (unit: ° C.), the acid resistance A (unit: mg/cm$^2$), the above $N_L$ (unit: number/cm$^2$), the above $N_S$ (unit: $10^4$/cm$^2$) were measured by the following methods. The results are shown in Tables. In the Tables, those identified by * are values assumed from the composition, and "-" means "not measured".

$T_g$: Using a differential thermal dilatometer, the elongation of glass when quartz glass as a reference specimen was heated at a rate of 5° C./min from room temperature was measured up to the temperature where the glass was softened and elongation was no more observed, i.e. up to the yield point, whereby the temperature corresponding to the critical point in the thermal expansion curve was taken as the glass transition point.

α: From the thermal expansion curve obtained in the same manner as in the measurement of the above $T_g$, the average thermal coefficient at from 50 to 350° C. was calculated.

ρ: Measured by an Archimedes method.

E: Measured by an ultrasonic pulse method with respect to a glass plate having a thickness of from 8 to 20 mm and a size of 4 cm×4 cm.

$T_4$: Measured by a rotational viscometer.

$T_L$: The glass was pulverized into glass particles of about 2 mm by a mortar, and such glass particles were placed on a platinum boat and heat-treated for 24 hours in a furnace having temperature inclination. The maximum value of the temperature of the glass particles where crystals were precipitated, was taken as the liquid phase temperature. $T_L$ is preferably at most 1,200° C.

A: Both sides of a glass plate having a thickness of 2 mm and a size of 4 cm×4 cm were mirror-polished and cleaned with calcium carbonate and a neutral cleaning agent and then immersed in a 0.1 mol/L HCl aqueous solution heated at 90° C. for 20 hours. The weight reduction of the glass and the surface area of the glass before and after the immersion were measured, and the ratio was taken as the acid resistance.

$N_L$, $N_S$: Both sides of a glass plate having a thickness of from 1 to 2 mm and a size of 4 cm×4 cm were mirror-polished and cleaned with calcium carbonate and a neutral cleaning agent, and then the glass plate was put in a super accelerated life tester (an unsaturated type pressure cooker TPC-410, manufactured by Tabai Espec) and left to stand in a steam atmosphere at 120° C. under 2 atm for 20 hours. The area of a 200 μm square on the surface of the glass plate taken out, was observed by a differential interference microscope, whereby the number of deposits having a size of at least 10 μm, and the number of deposits having a size of at least 1 μm and less than 10 μm, were counted, and $N_L$ and $N_S$ were calculated from these numbers and the above-mentioned inspected area 200 μm×200 μm.

Glasses in Examples 1 to 8 represent Examples of the present invention, and glasses in Examples 9 to 13 represent Comparative Examples. The glass in Example 10 is the glass disclosed in U.S. Pat. No. 6,949,485 (Example 8).

TABLE 1

|  | Ex. 1 | Ex. 2 | Ex. 3 | Ex. 4 | Ex. 5 | Ex. 6 | Ex. 7 |
|---|---|---|---|---|---|---|---|
| $SiO_2$ | 54.4 | 54.7 | 53.6 | 53.0 | 52.9 | 51.2 | 51 |
| $Al_2O_3$ | 12.8 | 13.0 | 12.9 | 12.7 | 11.7 | 13 | 14.4 |
| MgO | 4.9 | 4.5 | 4.2 | 4.1 | 3.8 | 2.9 | 1.7 |
| CaO | 5.2 | 5.1 | 5.0 | 3.7 | 4.9 | 2.4 | 4 |
| SrO | 3.1 | 3.1 | 6.9 | 10.7 | 7.9 | 13.2 | 11.7 |
| BaO | 0 | 0 | 0 | 0 | 1.6 | 0 | 0 |
| $TiO_2$ | 4.8 | 4.8 | 4.2 | 4.1 | 4.1 | 4 | 4 |
| $ZrO_2$ | 1.9 | 1.9 | 1.8 | 1.8 | 3.3 | 3.5 | 3.5 |
| $Na_2O$ | 3.7 | 3.7 | 3.7 | 3.6 | 3.6 | 3.1 | 3.1 |
| $K_2O$ | 9.2 | 9.2 | 7.7 | 6.2 | 6.2 | 6.7 | 6.7 |
| $Na_2O + K_2O$ | 12.9 | 12.9 | 11.4 | 9.8 | 9.8 | 9.8 | 9.8 |
| $K_2O/Na_2O$ | 2.5 | 2.5 | 2.1 | 1.7 | 1.7 | 2.2 | 2.2 |
| $SiO_2/(TiO_2 + ZrO_2)$ | 8.1 | 8.2 | 8.9 | 9.0 | 7.1 | 6.8 | 6.8 |
| $T_g$ | 683 | 687 | 689 | 691 | 693 | 704 | 714 |
| α | 86 | 85 | 84 | 81 | 81 | 80 | 80 |
| ρ | 2.62 | 2.61 | 2.67 | 2.71 | 2.73 | 2.76 | 2.75 |
| E | 78 | 78* | 80* | 81 | 82* | 78* | 82 |
| $T_4$ | 1161 | 1170* | 1152* | 1147 | 1151* | 1170* | 1185 |
| $T_L$ | 1200 | 1180 | 1180 | 1140 | — | 1150 | 1170 |
| A | 0.05* | 0.05* | 0.05* | 0.03 | 0.05* | 0.05* | 0.05* |
| $N_L$ | 0* | 0* | 0 | 0 | 0* | 0* | 0* |
| $N_S$ | 2* | 2* | 2 | 2 | 1* | 1* | 0* |

TABLE 2

|  | Ex. 8 | Ex. 9 | Ex. 10 | Ex. 11 | Ex. 12 | Ex. 13 |
|---|---|---|---|---|---|---|
| $SiO_2$ | 50.3 | 53.7 | 43.9 | 58.2 | 54.4 | 54.7 |
| $Al_2O_3$ | 16.4 | 12.6 | 16.5 | 13.0 | 12.8 | 12.9 |
| MgO | 1.1 | 4.8 | 2.6 | 7.4 | 4.9 | 4.9 |
| CaO | 3.5 | 5.2 | 8.9 | 2.8 | 6.1 | 7.0 |
| SrO | 11.6 | 3.1 | 14 | 0 | 0 | 0 |
| BaO | 0 | 0.0 | 0.5 | 0 | 0 | 0 |
| $TiO_2$ | 3.9 | 2.4 | 8.8 | 3.7 | 7.2 | 4.9 |
| $ZrO_2$ | 3.4 | 5.5 | 0 | 0 | 0 | 1.9 |
| $Na_2O$ | 2.6 | 3.7 | 2.3 | 0.5 | 0.5 | 2.4 |
| $K_2O$ | 7.2 | 9.1 | 2.5 | 14.5 | 14.2 | 11.4 |
| $Na_2O + K_2O$ | 9.8 | 12.8 | 4.8 | 15.0 | 14.7 | 13.8 |
| $K_2O/Na_2O$ | 2.8 | 2.5 | 1.1 | 30.4 | 30.4 | 4.9 |
| $SiO_2/(TiO_2 + ZrO_2)$ | 6.9 | 6.8 | 5.0 | 15.8 | 7.5 | 8.1 |
| $T_g$ | 733 | 696 | 710 | 685* | 700* | 691* |
| α | 78 | 84 | 75 | 74* | 76* | 78* |
| ρ | 2.73 | 2.65 | 2.89 | 2.49* | 2.55* | 2.58* |
| E | 79* | 81 | 90* | 81* | 86* | 85* |
| $T_4$ | 1227* | 1185 | 1076* | 1225* | 1184* | 1176* |
| $T_L$ | — | 1) | — | 1) | 1) | 1) |
| A | 0.05* | 0.05* | 11.3 | 0.05* | 0.05* | 0.05* |
| $N_L$ | 0* | 0* | 0 | 0* | 0* | 0* |
| $N_S$ | 3* | 8* | 1 | 8* | 5* | 3* |

1): Higher than 1200

TABLE 3

|  | Ex. 1 | Ex. 2 | Ex. 3 | Ex. 4 | Ex. 5 | Ex. 6 | Ex. 7 |
|---|---|---|---|---|---|---|---|
| $SiO_2$ | 60.0 | 60.6 | 60.0 | 60.1 | 60.0 | 60.0 | 59.9 |
| $Al_2O_3$ | 8.3 | 8.5 | 8.5 | 8.5 | 7.8 | 9.0 | 10.0 |
| MgO | 8.1 | 7.4 | 7.0 | 6.9 | 6.4 | 5.1 | 3.0 |
| CaO | 6.2 | 6.1 | 6.0 | 4.5 | 6.0 | 3.0 | 5.0 |
| SrO | 2.0 | 2.0 | 4.5 | 7.0 | 5.2 | 9.0 | 8.0 |
| BaO | 0 | 0 | 0 | 0 | 0.7 | 0 | 0 |
| $TiO_2$ | 4.0 | 4.0 | 3.5 | 3.5 | 3.5 | 3.5 | 3.5 |
| $ZrO_2$ | 1.0 | 1.0 | 1.0 | 1.0 | 1.8 | 2.0 | 2.0 |
| $Na_2O$ | 4.0 | 4.0 | 4.0 | 4.0 | 4.0 | 3.5 | 3.5 |
| $K_2O$ | 6.5 | 6.5 | 5.5 | 4.5 | 4.5 | 5.0 | 5.0 |
| (SrO + BaO)/RO | 0.12 | 0.13 | 0.26 | 0.38 | 0.32 | 0.53 | 0.50 |

TABLE 4

|  | Ex. 8 | Ex. 9 | Ex. 10 | Ex. 11 | Ex. 12 | Ex. 13 |
|---|---|---|---|---|---|---|
| $SiO_2$ | 60.0 | 60.0 | 51.2 | 63.0 | 60.0 | 60.0 |
| $Al_2O_3$ | 11.5 | 8.3 | 11.3 | 8.3 | 8.3 | 8.3 |
| MgO | 2.0 | 8.0 | 4.5 | 12.0 | 8.0 | 8.0 |
| CaO | 4.5 | 6.2 | 11.1 | 3.2 | 7.2 | 8.2 |
| SrO | 8.0 | 2.0 | 9.5 | 0 | 0 | 0 |
| BaO | 0 | 0 | 0.2 | 0 | 0 | 0 |
| $TiO_2$ | 3.5 | 2.0 | 7.7 | 3.0 | 6.0 | 4.0 |
| $ZrO_2$ | 2.0 | 3.0 | 0.0 | 0 | 0 | 1.0 |
| $Na_2O$ | 3.0 | 4.0 | 2.6 | 0.5 | 0.5 | 2.5 |
| $K_2O$ | 5.5 | 6.5 | 1.9 | 10.0 | 10.0 | 8.0 |
| (SrO + BaO)/RO | 0.55 | 0.12 | 0.55 | 0 | 0 | 0 |

In Tables 5 and 6, glass compositions as represented by mass %, and $T_g$, $\alpha$, $\rho$, E, $T_4$, $T_L$, A, $N_L$ and $N_S$ assumed from the compositions, are shown. Examples 14 to 22 represent Examples of the present invention, and Example 23 represents a Comparative Example.

Further, in Tables 7 and 8, the compositions represented by mol % of the glasses in Examples 14 to 23, are shown.

TABLE 5

|  | Ex. 14 | Ex. 15 | Ex. 16 | Ex. 17 | Ex. 18 | Ex. 19 | Ex. 20 |
|---|---|---|---|---|---|---|---|
| $SiO_2$ | 49.0 | 59.0 | 50.1 | 50.2 | 51.1 | 51.1 | 49.5 |
| $Al_2O_3$ | 13.9 | 8.7 | 19.0 | 11.2 | 12.3 | 12.3 | 15.6 |
| MgO | 0.1 | 2.1 | 0 | 3.9 | 4.0 | 3.1 | 0 |
| CaO | 2.0 | 6.0 | 6.0 | 0 | 4.0 | 4.4 | 4.4 |
| SrO | 14.0 | 1.0 | 1.0 | 9.0 | 1.5 | 5.1 | 1.0 |
| BaO | 0.0 | 0 | 8.1 | 4.7 | 12.0 | 8.7 | 10.2 |
| $TiO_2$ | 2.8 | 4.8 | 4.4 | 4.4 | 4.0 | 4.0 | 4.4 |
| $ZrO_2$ | 4.9 | 4.9 | 1.1 | 5.0 | 1.7 | 1.7 | 4.9 |
| $Na_2O$ | 2.0 | 2.0 | 4.7 | 2.0 | 3.5 | 3.5 | 7.0 |
| $K_2O$ | 11.4 | 11.5 | 5.6 | 9.6 | 6.0 | 6.0 | 3.0 |
| $Na_2O + K_2O$ | 13.4 | 13.5 | 10.3 | 11.6 | 9.5 | 9.5 | 10.0 |
| $K_2O/Na_2O$ | 0.18 | 5.8 | 1.2 | 4.8 | 1.7 | 1.7 | 0.4 |
| $SiO_2/(TiO_2 + ZrO_2)$ | 6.40 | 6.1 | 9.1 | 5.3 | 9.0 | 9.0 | 5.3 |
| $T_g$ | 687 | 685 | 726 | 695 | 709 | 701 | 718 |
| $\alpha$ | 88.9 | 81 | 81 | 81 | 80 | 81 | 81 |
| $\rho$ | 2.77 | 2.58 | 2.70 | 2.80 | 2.80 | 2.80 | 2.80 |
| E | 75 | 75 | 75 | 78 | 78 | 78 | 77 |
| $T_4$ | 1215 | 1220 | 1274 | 1205 | 1205 | 1183 | 1250 |
| $T_L$ | — | — | — | — | — | — | — |
| A | — | — | — | — | — | — | — |
| $N_L$ | 0 | — | — | — | — | — | — |
| $N_S$ | 20 | 1 | 1 | 20 | 5 | 3 | 1 |

TABLE 6

|  | Ex. 21 | Ex. 22 | Ex. 23 |
|---|---|---|---|
| $SiO_2$ | 54.2 | 54.6 | 47.5 |
| $Al_2O_3$ | 10.9 | 9.0 | 11.4 |
| MgO | 6.9 | 2.9 | 0.0 |
| CaO | 1.6 | 5.8 | 3.3 |
| SrO | 1.0 | 1.0 | 9.5 |
| BaO | 0 | 3.7 | 14.1 |
| $TiO_2$ | 4.8 | 4.7 | 3.7 |
| $ZrO_2$ | 5.0 | 4.9 | 1.6 |
| $Na_2O$ | 2.0 | 2.1 | 3.3 |
| $K_2O$ | 13.7 | 11.3 | 5.6 |
| $Na_2O + K_2O$ | 15.8 | 13.3 | 8.8 |
| $K_2O/Na_2O$ | 6.9 | 5.5 | 1.7 |
| $SiO_2/(TiO_2 + ZrO_2)$ | 5.6 | 5.7 | 9.0 |
| $T_g$ | 681 | 688 | 706 |
| $\alpha$ | 85 | 85 | 75 |
| $\rho$ | 2.59 | 2.67 | 2.97 |
| E | 77 | 76 | 86 |
| $T_4$ | 1198 | 1194 | 1190 |
| $T_L$ | — | — | — |
| A | — | — | — |
| $N_L$ | — | — | — |
| $N_S$ | 5 | 1 | 1 |

TABLE 7

|  | Ex. 14 | Ex. 15 | Ex. 16 | Ex. 17 | Ex. 18 | Ex. 19 | Ex. 20 |
|---|---|---|---|---|---|---|---|
| $SiO_2$ | 60.4 | 65.9 | 60.0 | 60.1 | 60.0 | 60.0 | 60.1 |
| $Al_2O_3$ | 10.1 | 5.7 | 13.4 | 7.9 | 8.5 | 8.5 | 11.2 |
| MgO | 0.1 | 3.5 | 0 | 7.0 | 7.0 | 5.5 | 0.0 |
| CaO | 2.6 | 7.2 | 7.7 | 0.0 | 5.0 | 5.5 | 5.7 |
| SrO | 10.0 | 0.6 | 0.7 | 6.2 | 1.0 | 3.5 | 0.7 |
| BaO | 0.0 | 0.0 | 3.8 | 2.2 | 5.5 | 4.0 | 4.8 |
| $TiO_2$ | 2.6 | 4.0 | 4.0 | 4.0 | 3.5 | 3.5 | 4.0 |
| $ZrO_2$ | 2.9 | 2.7 | 0.6 | 2.9 | 1.0 | 1.0 | 2.9 |

TABLE 7-continued

|  | Ex. 14 | Ex. 15 | Ex. 16 | Ex. 17 | Ex. 18 | Ex. 19 | Ex. 20 |
|---|---|---|---|---|---|---|---|
| Na$_2$O | 2.4 | 2.2 | 5.5 | 2.3 | 4.0 | 4.0 | 8.2 |
| K$_2$O | 8.9 | 8.2 | 4.3 | 7.3 | 4.5 | 4.5 | 2.3 |
| (SrO + BaO)/RO | 0.78 | 0.06 | 0.37 | 0.55 | 0.35 | 0.41 | 0.49 |

TABLE 8

|  | Ex. 21 | Ex. 22 | Ex. 23 |
|---|---|---|---|
| SiO$_2$ | 60.3 | 62.3 | 60.0 |
| Al$_2$O$_3$ | 7.1 | 6.1 | 8.5 |
| MgO | 11.4 | 5.0 | 0.0 |
| CaO | 1.9 | 7.1 | 4.5 |
| SrO | 0.6 | 0.7 | 7.0 |
| BaO | 0.0 | 1.6 | 7.0 |
| TiO$_2$ | 4.0 | 4.0 | 3.5 |
| ZrO$_2$ | 2.7 | 2.7 | 1.0 |
| Na$_2$O | 2.2 | 2.3 | 4.0 |
| K$_2$O | 9.8 | 8.2 | 4.5 |
| (SrO + BaO)/RO | 0.05 | 0.16 | 0.76 |

INDUSTRIAL APPLICABILITY

The glass substrate according to the present invention is useful in a wide range of fields as a substrate for data storage media such as magnetic disks or optical disks.

The entire disclosure of Japanese Patent Application No. 2007-077020 filed on Mar. 23, 2007 including specification, claims, drawings and summary is incorporated herein by reference in its entirety.

What is claimed is:

1. A substrate glass for data storage medium, comprising as represented by mass %:
   from 47 to 60% of SiO$_2$;
   from 8 to 20% of Al$_2$O$_3$;
   from 0 to 8% of MgO;
   from 2.0 to 6% of CaO;
   from 1 to 18% of SrO;
   from 0 to 13% of BaO;
   from 2.8 to 6% of TiO$_2$:
   from 1 to 5% of ZrO$_2$;
   from 2 to 8% of Na$_2$O and
   from 1 to 15% of K$_2$O;
   wherein
   a glass transition temperature of the substrate glass is at least 680° C., and
   a mol % of SiO$_2$ is at least 59 mol %.

2. The substrate glass for data storage medium according to claim 1, wherein a ratio of mass % K$_2$O to the mass % Na$_2$O (K$_2$O/Na$_2$O) is at least 1.5.

3. The substrate glass for data storage medium according to claim 2, wherein the ratio K$_2$O/Na$_2$O is at most 10.

4. The substrate glass for data storage medium according to claim 1, wherein a sum of the content of K$_2$O and the content of Na$_2$O (K$_2$O+Na$_2$O) is at most 16 mass %.

5. The substrate glass for data storage medium according to claim 4, wherein the sum (K$_2$O+Na$_2$O) is at most 13 mass %.

6. The substrate glass for data storage medium according to claim 1, wherein a ratio of the mass % of SiO$_2$ to the sum of the mass % TiO$_2$ and ZrO$_2$ (SiO$_2$/(TiO$_2$+ZrO$_2$)) is from 5.0 to 10.0.

7. The substrate glass for data storage medium according to claim 1, wherein the mass % Al$_2$O$_3$ is at least 11 mass %.

8. The substrate glass for data storage medium according to claim 1, wherein a sum of mass % TiO$_2$ and ZrO$_2$ is at most 11 mass %.

9. The substrate glass for data storage medium according to claim 1, wherein a sum of a mol % of BaO and a mol % ZrO$_2$ is at most 6.5 mol %.

10. The substrate glass for data storage medium according to claim 1, wherein a density of the substrate glass is at most 2.8 g/cm$^3$.

11. The substrate glass for data storage medium according to claim 1, wherein $$T_L - T_4 \leq 50° C.,$$

wherein
   $T_L$ is a liquid phase temperature in units of ° C., and
   $T_4$ is a temperature at which the viscosity of the substrate glass becomes 10$^4$ dPa·s.

12. The substrate glass for data storage medium according to claim 1, wherein a weight reduction of the substrate glass is at most 5 mg/cm$^2$ when the glass is immersed in a 0.1 mol/L HCl aqueous solution at 90° C. for 20 hours.

13. The substrate glass for data storage medium according to claim 1, wherein an average linear expansion coefficient of the substrate glass is at least 75×10$^{-7}$/° C. at from 50 to 350° C.

14. A glass substrate, comprising: the substrate glass for data storage medium as defined in claim 1.

15. A glass substrate made of the substrate glass for data storage medium as defined in claim 1, wherein a number of deposits having a size of at least 10 μm present on the surface of the glass substrate held in a steam atmosphere at 120° C. under 2 atm for 20 hours, is at most 1/cm$^2$, and a number of deposits having a size of at least 1 μm and less than 10 μm present thereon is at most 10$^7$/cm$^2$.

16. A glass substrate, comprising: the substrate glass for data storage medium as defined in claim 1, wherein a Young's modulus of the substrate glass is at least 75 GPa.

* * * * *